(12) United States Patent
Fahrenthold (10) Patent No.: US 8,587,801 B2
(45) Date of Patent: Nov. 19, 2013

(54) FACSIMILE DEVICE FOR DIRECTLY COMMUNICATING OVER IP NETWORKS

(75) Inventor: Kyle Fahrenthold, Princeton, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1151 days.

(21) Appl. No.: 11/956,629

(22) Filed: Dec. 14, 2007

(65) Prior Publication Data

US 2009/0153908 A1    Jun. 18, 2009

(51) Int. Cl.
*H04N 1/00* (2006.01)
*H04N 1/32* (2006.01)
*G06F 3/12* (2006.01)

(52) U.S. Cl.
USPC ............... 358/1.15; 358/425; 358/434

(58) Field of Classification Search
USPC ........ 358/1.15, 400, 442, 468, 425, 434, 435, 358/436, 438, 439
See application file for complete search history.

(56) References Cited

U.S. PATENT DOCUMENTS

| 5,828,836 A * | 10/1998 | Westwick et al. ............. 709/200 |
| 7,031,033 B2 * | 4/2006 | Asahi ............................. 358/479 |
| 2004/0196833 A1 * | 10/2004 | Dahan et al. ................. 370/352 |

FOREIGN PATENT DOCUMENTS

JP    2002101256 A  *  4/2002

* cited by examiner

*Primary Examiner* — Thomas D Lee (57) ABSTRACT

Implementations described herein may provide fax terminals that can communicate directly with one another over packet-based networks. In one implementation, a fax device may include a network connection configured to connect the device to a packet-based network. The fax device may further include a control unit. The control unit may, in response to a user command, transmit a facsimile document via the network connection and the packet-based network. The fax device may be implemented as a single integrated facsimile appliance.

18 Claims, 9 Drawing Sheets

FACSIMILE DEVICE FOR DIRECTLY COMMUNICATING OVER IP NETWORKS

BACKGROUND INFORMATION

Conventional facsimile (fax) machines are commonly used to transmit copies of documents over the public switched telephone network (PSTN). Such facsimile machines generally connect to one another based on a protocol known as the T.30 protocol.

More recently, packet-based networks, such as Internet Protocol (IP) networks, are being used as alternatives to conventional PSTN networks. Voice over IP (VoIP), for example, is commonly used to transmit voice over IP networks. However, because most VoIP systems are optimized (e.g., through the use of bandwidth-saving compression) for voice rather than data calls, conventional facsimile machines may work poorly or not at all. The T.38 fax relay standard is one protocol designed to address this problem.

In a typical combined T.38 and T.30 connection, analog fax terminal devices communicate over a PSTN network using the T.30 protocol with gateway devices. The gateway devices communicate over IP networks using the T.38 protocol. In general, the T.38 protocol functions to make the IP network "invisible" to the two endpoint analog fax terminals. The T.38 protocol may, for example, correct for network delays with so-called spoofing techniques or other techniques so that the two fax terminals are "fooled" into "thinking" that they are each communicating directly with one another.

DETAILED DESCRIPTION OF PREFERRED EMBODIMENTS

The following detailed description refers to the accompanying drawings. The same reference numbers in different drawings may identify the same or similar elements. Also, the following description does not limit the invention.

Implementations described herein may provide fax terminals that can communicate directly over packet-based networks without the need for a converting gateway device. The fax terminals may be capable of simultaneously implementing multiple fax sessions with one or multiple terminating fax terminals.

Figure 1:
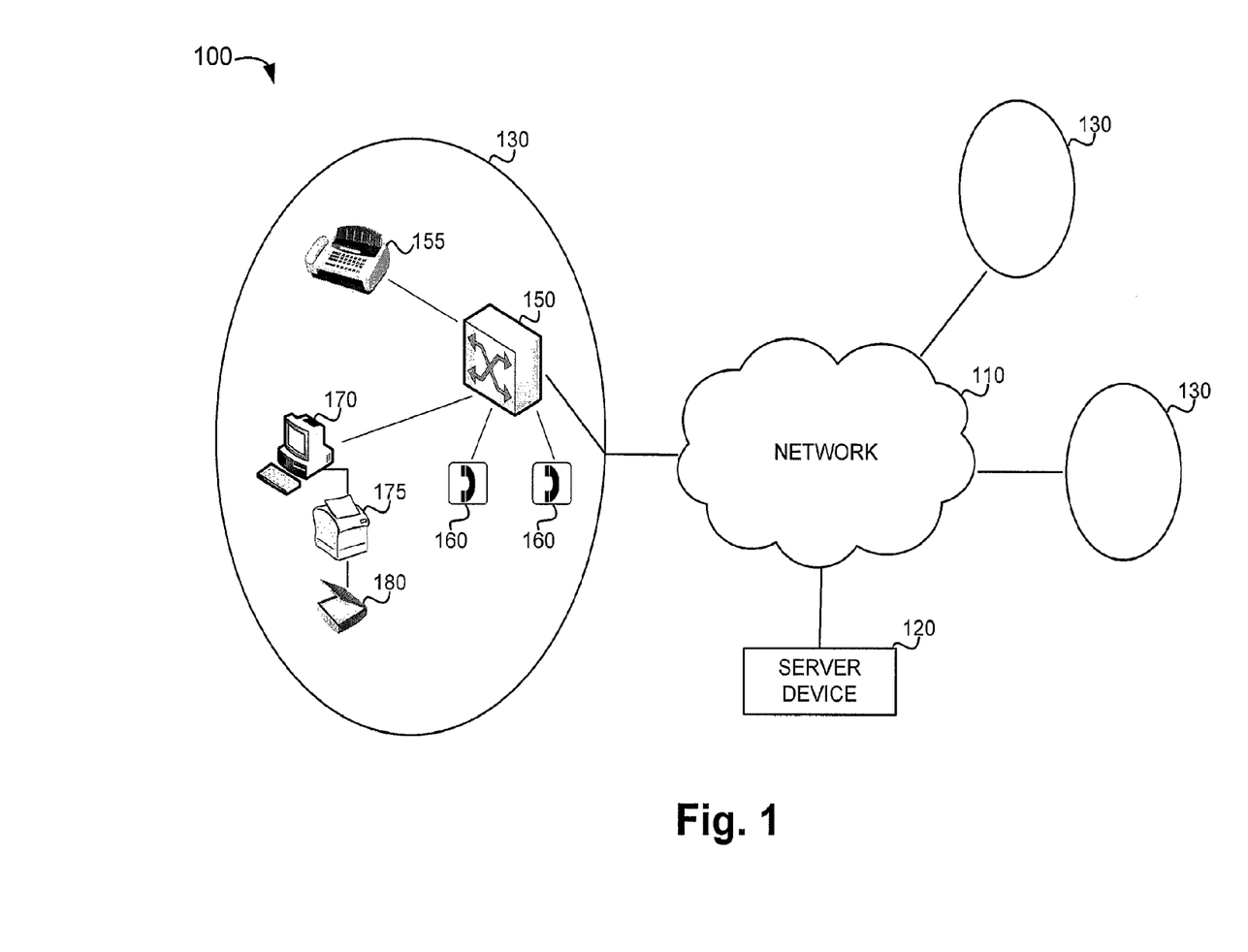
FIG. 1 is a diagram that illustrates an exemplary system described herein.

FIG. 1 is a diagram that illustrates an exemplary system 100. As shown, system 100 includes a network 110. A number of devices and/or sub-networks may be connected to system 100, such as server device 120 and local area networks (LANs) 130.

Network 110 may include one or more networks of any type, including a Public Land Mobile Network (PLMN), a Public Switched Telephone Network (PSTN), a local area network (LAN), a metropolitan area network (MAN), a wide area network (WAN), a private network, the Internet, an intranet, and/or another type of network. In one particular implementation, network 110 may include a packet-based IP network, such as the Internet, and may be used for, among other things, VoIP communications.

Server device 120 may include a server entity. An entity may be defined as a device, such as a computer or another type of computation or communication device, a thread or process running on one of these devices, and/or an object executable by one of these devices. Server device 120 may generally provide services to other devices connected to network 110. In one embodiment, server device 120 may include a session initiation protocol (SIP) proxy server that assists terminal devices, such as SIP user agents in one or more of LANs 130, in signaling and call setup operations for IP-based communications, such as IP-based fax transmissions.

LANs 130 may each include a number of networked devices. A local area network may be, for example, a network implemented by a corporation or other entity. Exemplary devices are particularly shown for one of the LANs 130 shown in FIG. 1. This network is particularly shown as including a switch (or router) 150 that connects LAN 130 to network 110. A number of devices may be connected to switch 150, including a VoIP fax device 155, VoIP phones 160, and a personal computer 170. Personal computer 170 may be configured to connect to a printer 175 and a scanner 180.

Fax device 155, consistent with aspects described herein, may generally be capable of acting as a stand-alone fax terminal device that can communicate directly over packet-based networks. Fax device 155 will be described in more detail below.

VoIP phones 160 may be stand-alone phone devices capable of initiating VoIP calls over network 110. Alternatively, VoIP phones may be "soft-phones" that are implemented as software on a personal computer or other multi-function or general purpose computing device.

Personal computer 170 may include any type of computational or communication device, such as a personal computer, lap top, a personal digital assistant (PDA), or another type of device capable of communicating over a network. Personal computer 170 may, in some implementations, run software that allows personal computer 170 to function similarly to fax device 155. For example, a user may scan documents via scanner 180 and then transmit the documents, as a fax document, directly over an IP network, such as network 110. Similarly, personal computer 170 may receive documents from another fax machine directly from an IP network, such as network 110, and then print the documents to paper using printer 175.

Figure 2:
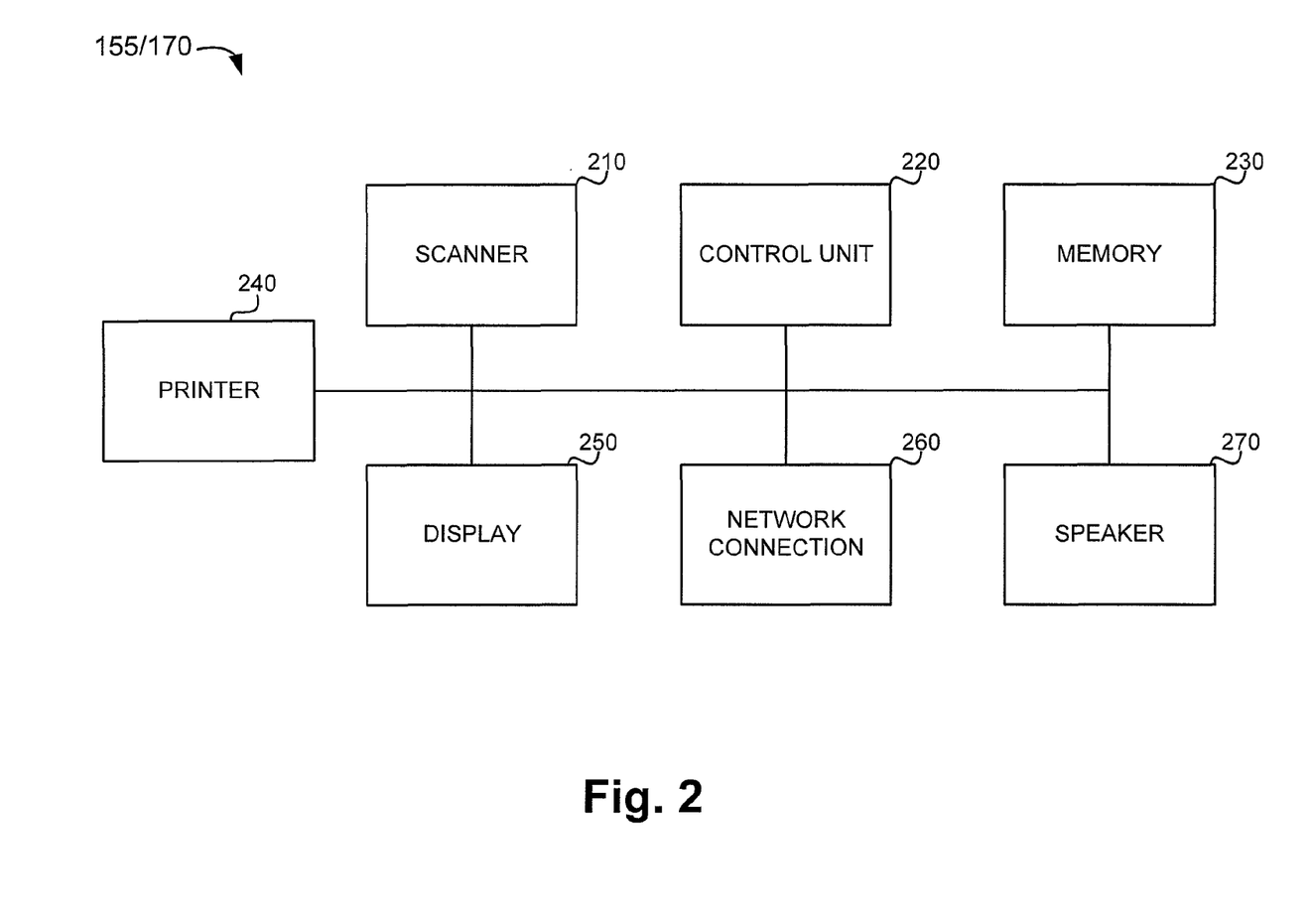
FIG. 2 is a diagram illustrating exemplary components of certain of the devices shown in FIG. 1.

FIG. 2 is a diagram illustrating exemplary components of fax device 155 or of personal computer 170, printer 175, and scanner 180 (referred to as device 155/170 herein). Device 155/170 may include a scanner 210, a control unit 220, a memory 230, a printer 240, a display 250, a network connection 260, and a speaker 270.

Scanner 210 may include logic and/or mechanical components designed to optically scan paper media. Scanner 210 may include, for instance, an automated sheet feeding device and an optical scanning component designed to digitize one or more sheets of paper. When device 155/170 includes personal computer 170, scanner 210 may be physically separated from device 155/170. When device 155/170 includes stand-alone fax device 155, scanner 210 may be physically integrated within device 155/170.

Control unit 220 may include a processor, microprocessor, or other types of processing logic that may interpret and execute instructions. Memory 230 may include a dynamic or static storage device that may store information and instructions for execution by control unit 220. For example, memory 230 may include a storing component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Printer 240 may include logic and/or mechanical components configured to print to paper or other physical media. Printer 240 may generally be used to print faxes received by device 155/170 although printer 240 may also be used to provide copies of documents or confirmation reports relating to a fax operation. When device 155/170 includes personal computer 170, printer 240 may be physically separated from device 155/170. When device 155/170 includes fax device 155, printer 250 may be physically integrated within device 155/170.

Display 250 may include an LCD, CRT, or other structure for outputting visual information to a user.

Network connection 260 may include any transceiver-like mechanism that enables device 155/170 to communicate with other devices and/or systems. For example, network connection 260 may include an Ethernet interface, an optical interface, a coaxial interface, a radio interface, or the like. Network connection 260 may allow for wired, wireless, and/or optical communication. Network connection 260 may be particularly configured to connect device 155/170 to a packet-based IP network, such as network 110. Network connection 250 may access network 110 via an Ethernet connection with switch 150.

Speaker 270 may be a speaker through which device 155/170 can provide audible output to a user. Control unit 220 may, for example, use speaker 270 to provide audible feedback relating to the status of a fax transmission.

As will be described in detail below, device 155/170 may perform certain operations relating to facsimile transmission over an IP network. Device 155/170 may perform these operations in response to control unit 220 executing software instructions contained in a computer-readable medium, such as memory 230. A computer-readable medium may be defined as a physical or logical memory device.

The software instructions may be read into memory 230 from another computer-readable medium or from another device via network connection 260. The software instructions contained in memory 230 may cause control unit 220 to perform processes that will be described later. Alternatively, hardwired circuitry may be used in place of or in combination with software instructions to implement processes described herein. Thus, implementations described herein are not limited to any specific combination of hardware circuitry and software.

Figure 3:
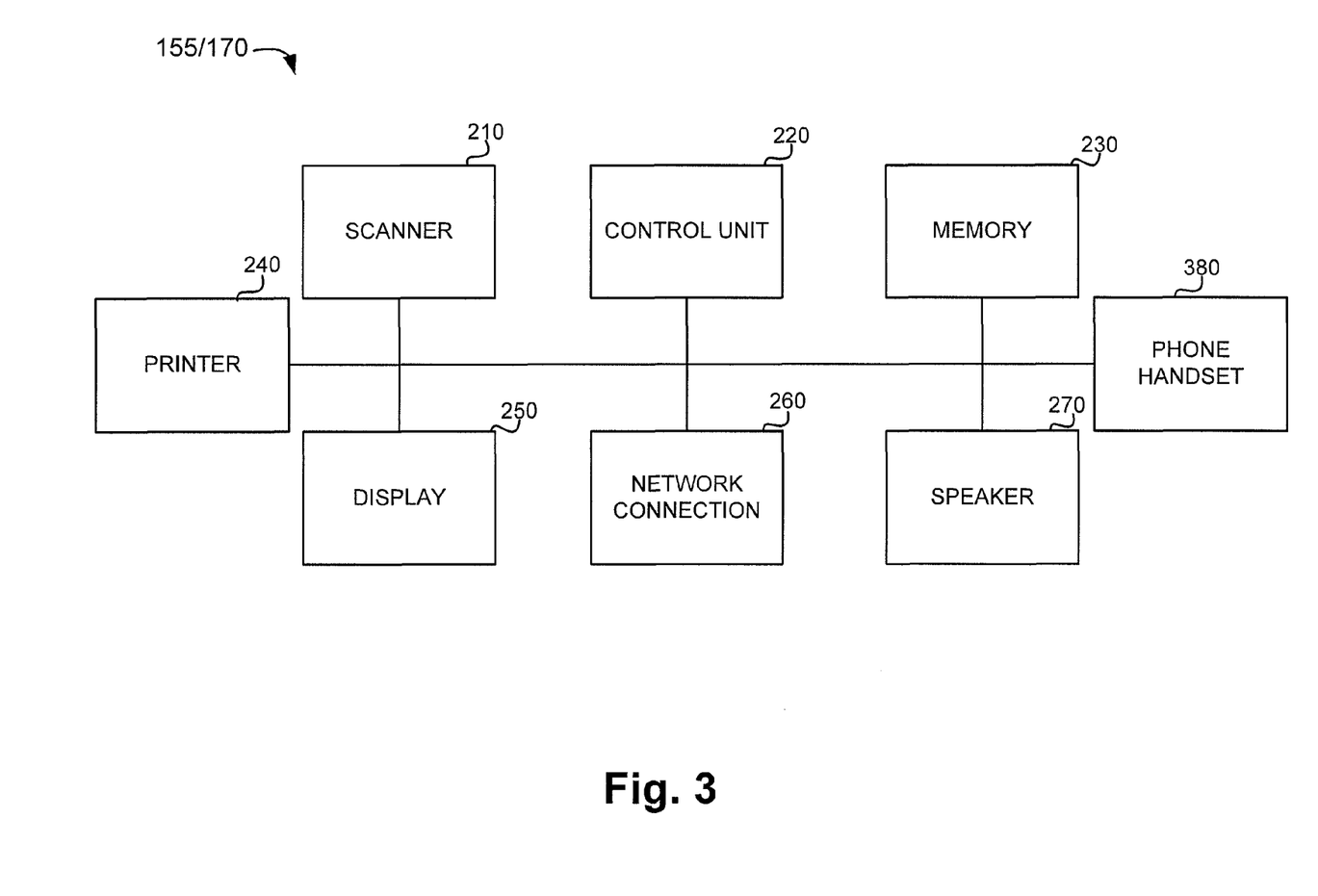
FIG. 3 is a diagram illustrating exemplary components of certain of the devices shown in FIG. 1 according to another embodiment.

FIG. 3 is a diagram illustrating exemplary components of device 155/170 according to a second exemplary embodiment of device 155/170. As shown in FIG. 3, device 155/170 may include a scanner 210, a control unit 220, a memory 230, a printer 240, a display 250, a network connection 260, a speaker 270, and a phone handset 380. Scanner 210, control unit 220, memory 230, printer 240, display 250, network connection 260, and speaker 270 may be implemented essentially identically to the implementations of these elements as described with respect to FIG. 2, and thus the implementations of these components will not be described again in detail.

Phone handset 380 may include a conventional telephone handset device through which users can speak to and hear voice from a called party. Phone handset 380 may be connected to device 155/170 through, for example, a wired connection (e.g., a telephone cord) or a wireless connection. With phone handset 380, device 155/170 may function as both a voice telephone and a facsimile device. In some implementations, as will be described in more detail below, both voice sessions and facsimile sessions may be simultaneously carried out.

Although, FIGS. 2 and 3 illustrate exemplary components of device 155/170, in other implementations, device 155/170 may include fewer, additional, and/or different components than those depicted in FIGS. 2 and 3. In still other implementations, one or more components of device 155/170 may perform one or more other tasks described as being performed by one or more other components of device 155/170.

Figure 4:
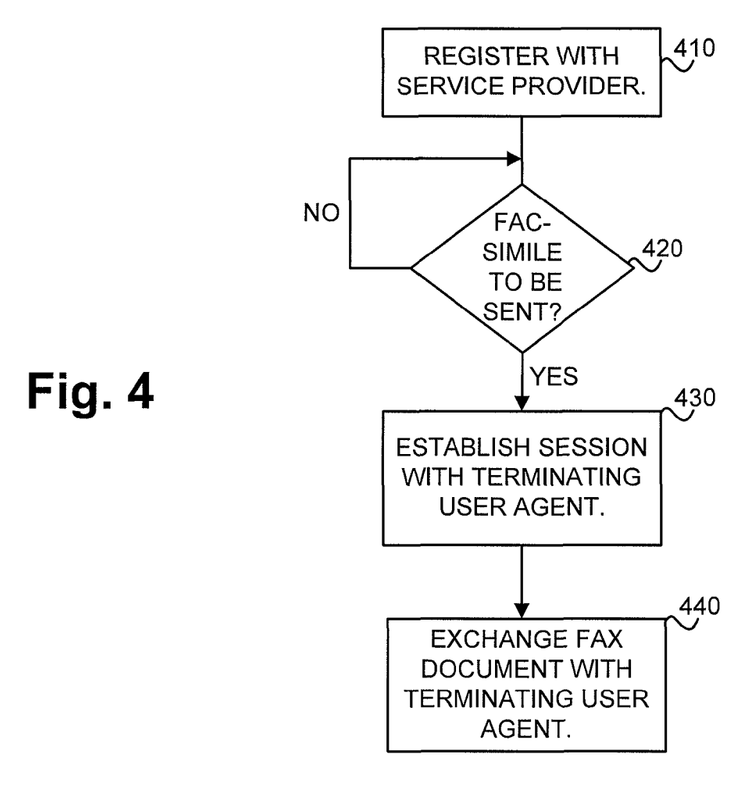
FIG. 4 is a flow chart of an exemplary process for conducting a facsimile session.

FIG. 4 is a flow chart of an exemplary process for conducting a facsimile session via device 155/170. In the description that follows, device 155/170 may be a device designed to use the SIP (Session Initiation Protocol) or other substantially real-time, packet-based, communications protocol to create, modify, and terminate facsimile or voice sessions. Device 155/170 may thus be a SIP user agent and may use VoIP services provided by a VoIP provider.

In other implementations, device 155/170 may use a protocol other than SIP to provide functions for session initiation and termination.

Initially, device 155/170 may register with a service provider that is providing the VoIP services to device 155/170 (act 410). LAN 130 may be, for example, a proprietary corporate network that may subscribe to VoIP services from a service provider (e.g., a telecommunications company). When registering with the service provider, device 155/170 may provide identification/credential information to identify device 155/170 as being a device authorized to receive services from the service provider. The registration may be performed, for example, when the device is first powered up, when the device changes network addresses, or at other times when the device needs to inform the service provider of its address and/or availability.

Figure 5:
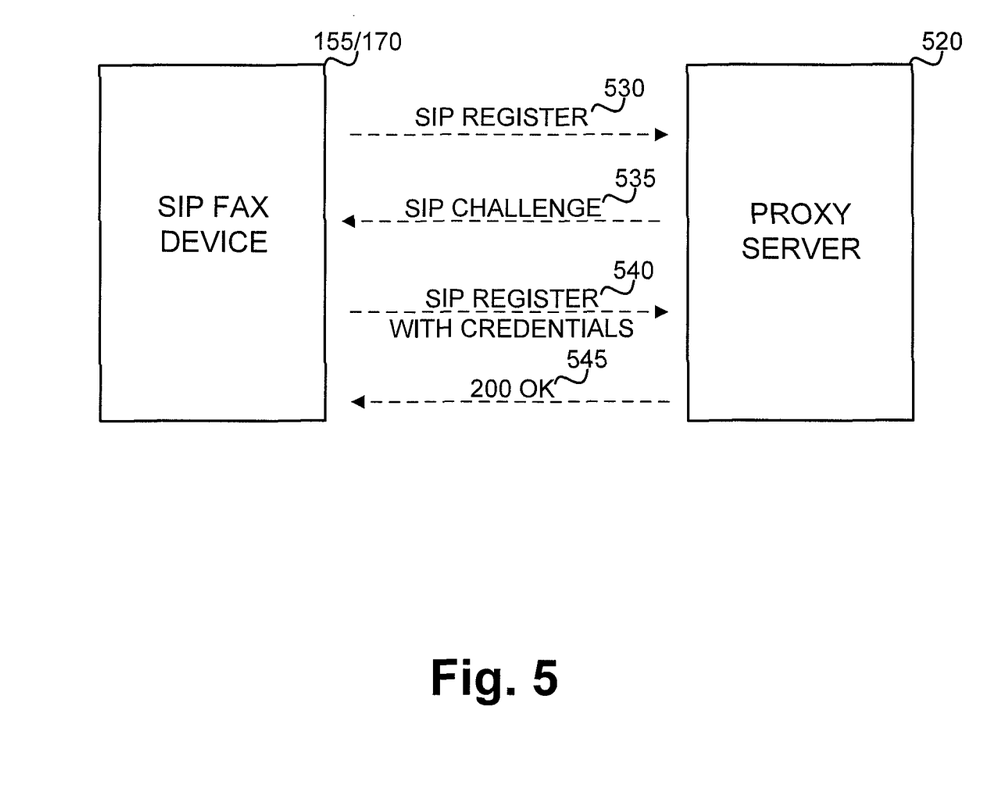
FIG. 5 is an exemplary timing diagram illustrating registration with a service provider.

FIG. 5 is an exemplary timing diagram illustrating registration with a service provider, as performed in act 410. In this example, device 155/170 is an IP fax device that initiates fax sessions using SIP. Assume that device 155/170 registers with a proxy server 520 controlled by the service provider. In the context of the system shown in FIG. 1, proxy server 520 may be, for example, a server such as server device 120.

Registration with the service provider may begin by device 155/170 sending a SIP register message 530. Proxy server 520 may respond with a SIP challenge message 535. SIP challenge message 535 may generally request that device 155/170 provide its authentication credentials. In response, device 155/170 may respond with a SIP register message 540 that includes the credentials, such as identification and authentication information, associated with device 155/170. If proxy server 520 accepts the credentials of device 155/170, it may it may respond with a SIP OK message 545 (i.e., a "SIP 200" response). Device 155/170 may then be registered with the service provider.

Referring back to FIG. 4, act some point, a user may indicate that one or more fax documents are to be sent (act 420—YES). For example, when device 155/170 is a stand-alone fax machine, a user may scan a document into device 155/170 or electronically transmit a document to device 155/170. When device 155/170 is a personal computer, the user may instruct or initiate a fax program running on the device to send the fax. In either case, the user may also provide a destination telephone number or other identification that indicates to what destination or recipient the fax is to be sent.

Device 155/170 may next establish a session with the terminating user agent (act 430). In one implementation, the session may be established using SIP. The terminating user agent may be another SIP facsimile device similar to device 155/170. Alternatively, when the final destination is a conventional analog fax machine, the terminating user agent may be a gateway device configured to forward the facsimile transmission as an analog fax document using a PSTN telephone network.

Using the session established in act 430, the fax document may be sent to the terminating user agent (act 440). In the situation when IP devices, such as device 155/170, are the terminating user agents, the fax document may be sent over essentially the entire fax link as a digital document sent over a packet-based network. For example, the T.38 protocol may be used by the two terminating user agents to transmit the document. In the situation when one of the terminating devices is a conventional analog fax machine, the document may be sent over the IP portion of the link using the T.38 protocol and over the analog portion of the link using the T.30 protocol. These two situations are illustrated in more detail in FIGS. 6-8.

Figure 6:
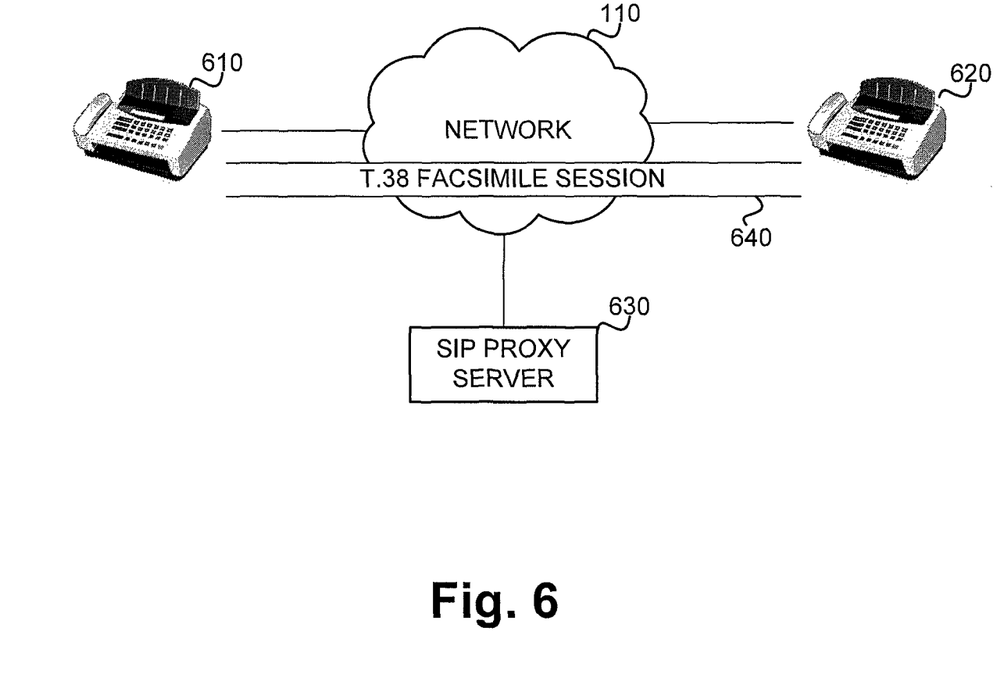
FIG. 6 is a diagram illustrating an exemplary facsimile system in which two terminating facsimile devices are IP devices.

FIG. 6 is a diagram illustrating an exemplary facsimile system in which both terminating facsimile devices are IP devices (i.e., an end-to-end IP connection). In this example, both terminating devices 610 and 620 may include SIP facsimile devices such as device 155/170. Each device may be, for example, a stand-alone SIP facsimile appliance that is connected via an Ethernet connection to an IP network, such as network 110. Devices 610 and 620 may exchange a fax document via a T.38 facsimile session 640. Facsimile session 640 may be initially negotiated and terminated using SIP. SIP proxy server 630 may enable the SIP communications.

Figure 7:
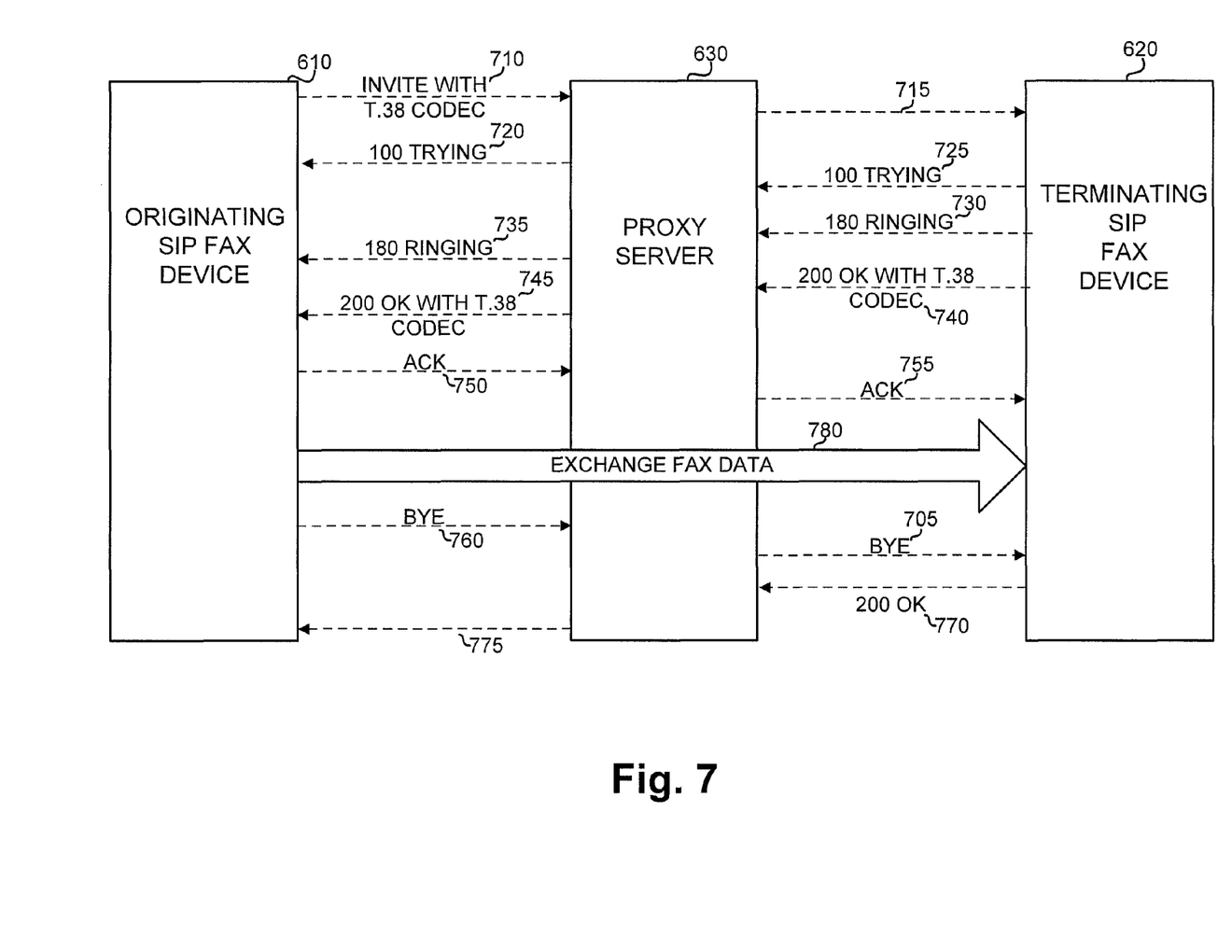
FIG. 7 is an exemplary timing diagram illustrating communications in an end-to-end facsimile transmission session.

FIG. 7 is a timing diagram illustrating exemplary communications in the end-to-end IP facsimile transmission shown in FIG. 6.

Device 610 may initiate sending of the facsimile. For example, the user may scan or otherwise provide device 610 with the document that is to be sent along with the destination facsimile number or other destination identification information (e.g. SIP address). In response, device 610 may send a SIP INVITE message 710, which may indicate that device 610 would like to send a document using the T.38 protocol. Proxy server 630 may forward this message, as message 715, to device 620. In forwarding the message, proxy server 630 may first use the facsimile number to lookup the current network address of device 620.

Proxy server 630 may respond to device 610 with a TRYING message 720 (SIP message 100). The "100 TRYING" response may indicate that the INVITE message 710 has been received by proxy server 630 but that the destination device has not yet responded. Device 620 may respond to INVITE message 715 with a TRYING message 725 and a RINGING message 730. RINGING message 730 may indicate that device is ringing (i.e., waiting for a the user to answer the incoming call or waiting for the device to automatically answer the incoming call). Proxy server 630 may forward RINGING message 735 to device 610.

At some point, device 620 responds with OK message 740. This message may indicate that device 620 has accepted INVITE message 710. Proxy server 630 may forward the OK message 740, labeled as OK message 745, to device 610. Device 610 may subsequently acknowledge that device 620 has accepted the transmission (ACK messages 750 and 755).

At this point, device 610 and 620 may communicate the fax document. The document may be transmitted using the T.38 protocol in a communication session 780 established between device 610 and 630. In contrast to the SIP signaling messages, which may be transmitted through proxy server 630, the document may be directly communicated between devices 610 and 630. In other words, devices 610 and 630 may use SIP to facilitate setting-up of the T.38 session 780, but then may directly communicate the fax document without using SIP.

SIP may also be used to terminate the fax session. More specifically, when fax session 780 is complete (i.e., the document has been sent), device 610 may transmit a SIP BYE message 760 to proxy server 630, which may forward the message, as BYE message 765, to device 620. Device 620 may acknowledge the BYE message with OK message 770, which is shown forwarded to device 610 as OK message 775.

Figure 8:
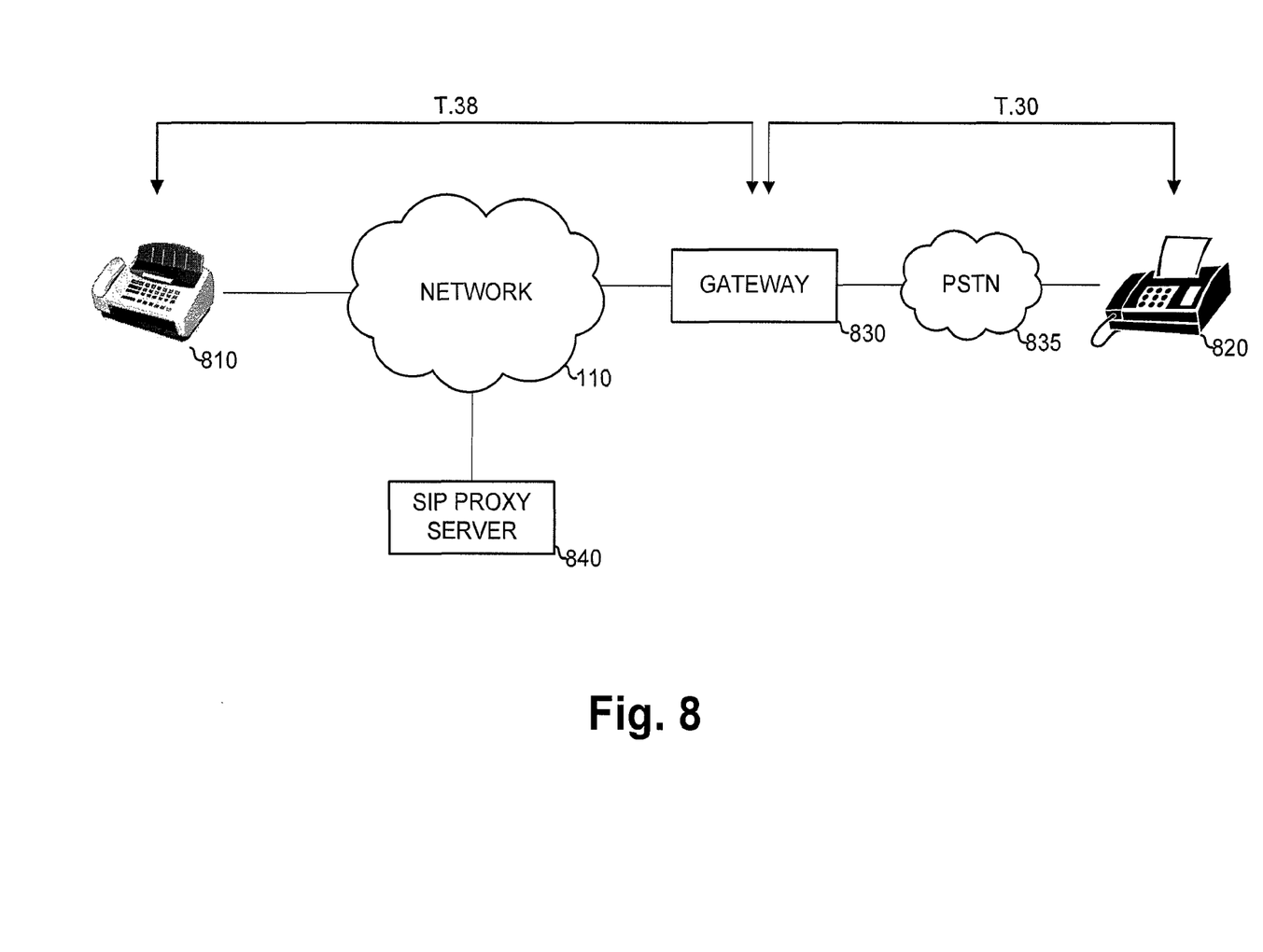
FIG. 8 is a diagram illustrating an exemplary facsimile system in which one of the terminating facsimile devices is an IP device and the other is a conventional analog fax machine.

FIG. 8 is a diagram illustrating an exemplary facsimile system in which one of the terminating facsimile device is an IP device, such as device 155/170, and the other is a conventional analog fax machine. In this situation, the document may be sent over the IP portion of the link using the T.38 protocol and over the analog portion of the link using the T.30 protocol. (i.e., an end-to-end IP connection). As shown, the system of FIG. 8 may include a terminating fax device 810, network 110, gateway 830, a PSTN network 835, a second terminating fax device 820, and a SIP proxy server 840.

More particularly, as shown in FIG. 8, terminating device 810 may include an IP facsimile device, such as device 155/170. Terminating device 820, however, may be a conventional analog fax machine. A fax document transmitted between devices 810 and 820 may traverse IP network 110 and PSTN network 835. Gateway device 830 may implement the transition between network 110 and network 835. SIP proxy server 840, connected to network 110, may enable SIP messaging over network 110 between device 810 and gateway 830.

In operation, device 810 and gateway 830 may exchange fax data with one another using the T.38 protocol and using SIP proxy server 840. Communications between device 810, gateway 830, and SIP proxy server 840 may be implemented in a manner similar to the communications between device 610, device 620, and proxy server 630, respectively, as discussed above with respect to FIGS. 6 and 7. In this example, however, gateway 830 is not the final destination for the fax document. Gateway 830 may forward the fax document to device 820 over network 835 using, for example, the T.30 protocol. In this manner, an IP terminating fax device, such as device 810, can exchange faxes with a conventional fax machine.

Figure 9:
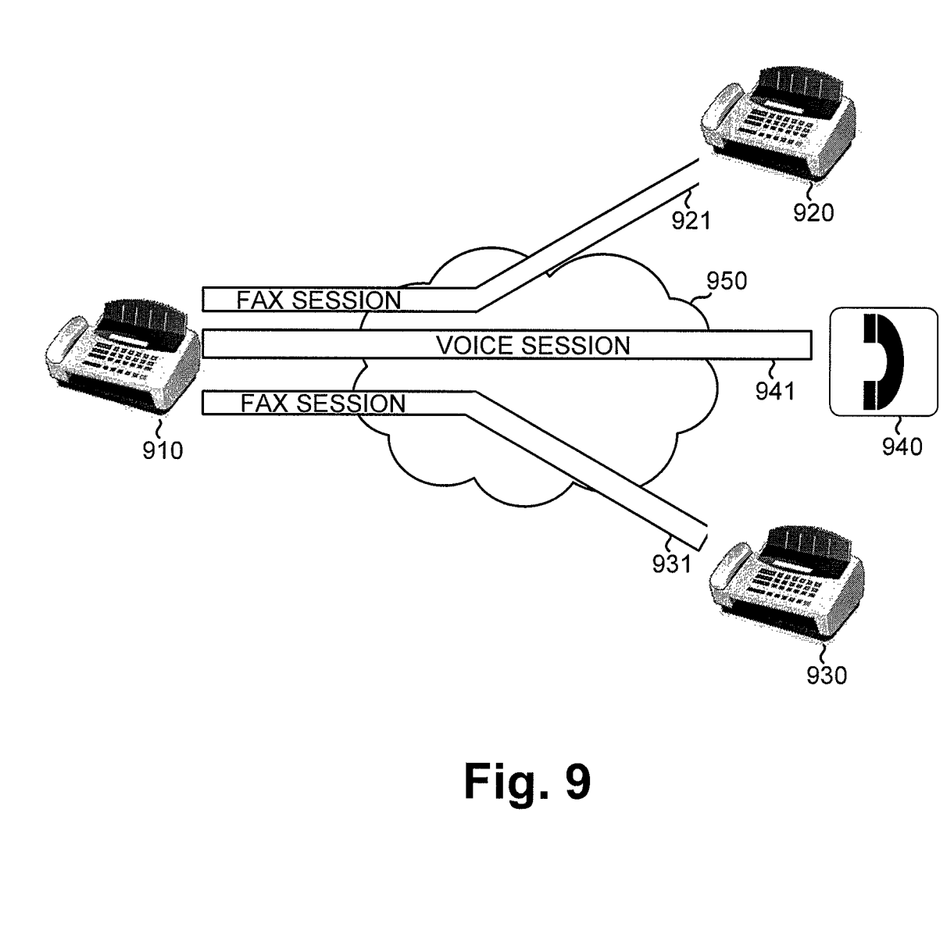
FIG. 9 is a diagram illustrating an exemplary situation in which an IP fax device communicates with multiple different terminating devices.

As previously mentioned, device 155/170 may simultaneously transmit multiple fax documents and/or maintain multiple voice calls. FIG. 9 is a diagram illustrating an exemplary situation in which an IP fax device, such as device 155/170, communicates with multiple different terminating devices substantially simultaneously or in an overlapping fashion.

As shown in FIG. 9, devices 910, 920, and 930 may be fax terminals that can communicate directly over IP networks, such as device 155/170. Device 940 may be a VoIP phone that does not have fax capabilities. Network 950 may be an IP network.

Device 910 may simultaneously service multiple communication sessions over network 950, shown as fax sessions 921 and 931, and voice session 941. Thus, device 940 can transmit multiple faxes simultaneously while a user of device 940 speaks to a party via VoIP session 941. The number of possible simultaneous sessions can be high and may generally only be limited by the network bandwidth between device 910 and the intended destinations, the processing ability of device 910, or the number of concurrent sessions allowed by the service provider.

The ability to fax a document while simultaneously speaking may be particularly useful in a number of situations. For example, a user having trouble faxing a document to a business may call the business from the fax machine while continuing to try and fax the document. The ability to fax multiple documents simultaneously may also be particularly useful in a number of situations. For example, a user may quickly "blast" a broadcast fax document to a large number of clients.

An IP-based fax device or fax "appliance" was described herein. Advantageously, the device may directly communicate with an IP network and can engage in multiple simultaneous fax and/or voice sessions.

The foregoing description of implementations provides illustration, but is not intended to be exhaustive or to limit the implementations to the precise form disclosed. Modifications and variations are possible in light of the above teachings or may be acquired from practice of the teachings.

In addition, while a series of blocks and/or acts have been described with regard to processes illustrated in FIG. 4 and the timing diagrams illustrated in FIGS. 5 and 7, the order of the acts and/or messages may be modified in other implementations. Further, non-dependent acts may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a", "an", and "the" are intended to include one or more items. Where only one item is intended, the term "one" or similar language is used. Further, the phrase "based on" is intended to mean "based, at least in part, on" unless explicitly stated otherwise.

What is claimed is:

1. A facsimile device comprising:
   a network connection to connect the facsimile device directly to a packet-based network, and
   a control unit to:
      register, when the facsimile device is powered up, the facsimile device with a service provider,
         when registering, the control unit being to:
            send, to a proxy server, a first message,
               the first message including a register message,
            receive, from the proxy server, a request to provide authentication credentials associated with the facsimile device,
            send, to the proxy server and based on receiving the request, a second message,
               the second message including the authentication credentials associated with the facsimile device, and
            receive, from the proxy server and based on sending the second message, an indication that the facsimile device is registered with the service provider,
      send, when the facsimile device is registered with the service provider, to a plurality of devices, and via the network connection, the packet-based network, and the proxy server, an indication that the facsimile device is attempting to transmit multiple facsimile documents,
      receive, from the plurality of devices and via the network connection, the packet-based network, and the proxy server, indications that the plurality of devices accept transmission of the multiple facsimile documents,
      maintain a plurality of voice calls via the network connection and the packet-based network, and
      simultaneously transmit, the multiple facsimile documents directly to the plurality of devices over multiple respective facsimile sessions via the network connection and the packet-based network,
      the maintaining and transmitting occurring simultaneously, and
      the facsimile device being implemented as a single integrated facsimile appliance.

2. The facsimile device of claim 1, where the control unit is further to:
   setup transmission of the multiple facsimile documents using Session Initiation Protocol (SIP).

3. The facsimile device of claim 2, where the control unit is further to:
   transmit the multiple facsimile documents using a T.38 protocol.

4. The facsimile device of claim 1, further comprising:
   a scanner to optically scan the multiple facsimile documents; and
   a printer to print received facsimile documents.

5. The facsimile device of claim 1, where the packet-based network comprises an Internet Protocol (IP) network.

6. The facsimile device of claim 1, further comprising:
   a phone handset to receive and transmit voice signals.

7. A device comprising:
   a network connection to connect the device to a packet-based network via a packet-based interface;
   a control unit to:
      register, when the device is powered up, the device with a service provider, when registering, the control unit being to:
send, to a proxy server, a first message,
the first message including a register message,
receive, from the proxy server, a request to provide authentication credentials associated with the device,
send, to the proxy server and based on receiving the request, a second message,
the second message including the authentication credentials associated with the device, and
receive, from the proxy server and based on sending the second message, an indication that the device is registered with the service provider,
send, when the device is registered with the service provider, to a plurality of other devices, and via the packet-based network and the proxy server, an indication that the device is attempting to transmit multiple facsimile transmissions,
receive, from the plurality of other devices and via the packet-based network and the proxy server, indications that the plurality of other devices accept transmission of the multiple facsimile transmissions,
maintain multiple voice calls over the packet-based network via the network connection, and
simultaneously transport the multiple facsimile transmissions to the plurality of other devices directly over the packet-based network via the network connection,
the maintaining and transporting occurring simultaneously.

8. The device of claim 7, further comprising:
a phone handset, and
where the control unit is additionally to support a voice session simultaneously with the multiple facsimile transmissions.

9. The device of claim 7, where the control unit is further to:
setup the multiple facsimile transmissions using Session Initiation Protocol (SIP).

10. The device of claim 9, where the control unit is further to:
transmit the multiple facsimile documents using a T.38 protocol.

11. The device of claim 7, further comprising:
a scanner to optically scan documents; and
a printer to print facsimile documents received via the multiple facsimile transmissions.

12. The device of claim 7, where the packet-based network comprises an Internet Protocol (IP) network.

13. A method comprising:
registering, when a facsimile device is powered up, the facsimile device with a service provider,
the registering including:
sending, to a proxy server, a first message,
the first message including a register message,
receiving, from the proxy server, a request to provide authentication credentials associated with the facsimile device;
sending, to the proxy server and based on receiving the request, a second message,
the second message including the authentication credentials associated with the facsimile device, and
receiving, from the proxy server and based on sending the second message, an indication that the facsimile device is registered with the service provider;
receiving, when the facsimile device is registered with the service provider and at the facsimile device, an indication regarding transmission of a first facsimile document and a second facsimile document;
sending, based on receiving the indication, to a first terminating facsimile machine and a second terminating facsimile machine, and via a packet-based network and the proxy server, an indication that the facsimile device is attempting to transmit the first facsimile document and the second facsimile document;
receiving, from the first terminating facsimile machine and the second terminating facsimile machine and via the packet-based network and the proxy server, indications that the plurality of devices accept transmission of the first facsimile document and the second facsimile document;
establishing, by the facsimile device, a first voice call over the packet-based network;
establishing, by the facsimile device, a second voice call over the packet-based network;
establishing, by the facsimile device, a first facsimile session with the first terminating facsimile machine,
the first session being established entirely over the packet-based network;
establishing, by the facsimile device, a second facsimile session with the second terminating facsimile machine,
the second session being established entirely over the packet-based network; and
simultaneously maintaining, by the facsimile device, the first voice call and the second voice call and transmitting, by the facsimile device, the first facsimile document over the first facsimile session and the second facsimile document over the second facsimile session.

14. The method of claim 13, where the first and second facsimile sessions are based on a T.38 facsimile protocol.

15. The method of claim 14, where the T.38 facsimile protocol is setup using Session Initiation Protocol (SIP).

16. The method of claim 13, further comprising:
establishing, over the packet-based network, a voice session that is conducted concurrently with the first and second facsimile sessions.

17. The method of claim 13, where the facsimile device and the first and second terminating facsimile machines are standalone facsimile appliances.

18. A device comprising:
means for registering a facsimile device with a service provider,
the means for registering including:
means for sending, to a proxy server, a first message,
the first message including a register message,
means for receiving, from the proxy server, a request to provide authentication credentials associated with the facsimile device,
means for sending, to the proxy server and based on receiving the request, a second message,
the second message including the authentication credentials associated with the facsimile device, and
means for receiving, from the proxy server and based on sending the second message, an indication that the facsimile device is registered with the service provider;
means for receiving, when the facsimile device is registered with the service provider and at the facsimile device, an indication regarding transmission of a plurality of facsimile documents;
means for sending, based on receiving the indication, to a plurality of terminating facsimile machines, and via a packet-based network and the proxy server, an indication that the facsimile device is attempting to transmit the plurality of facsimile documents;

means for receiving, from the plurality of terminating facsimile machines and via the packet-based network and the proxy server, indications that the plurality of terminating facsimile machines accept transmission of the plurality of facsimile documents;

means for establishing a first voice call over the packet-based network;

means for establishing a second voice call over the packet-based network;

means for establishing a plurality of facsimile sessions with the plurality of terminating facsimile machines, the plurality of facsimile sessions being established entirely over the packet-based network; and means for simultaneously maintaining the first and second voice calls and transmitting the plurality of facsimile documents over the plurality of facsimile sessions.

\* \* \* \* \*